United States Patent
Doganer (10) Patent No.: US 12,281,694 B2
(45) Date of Patent: Apr. 22, 2025

(54) GEARWHEEL TRANSMISSION COMPRISING WOBBLE MEMBER

(71) Applicant: SED-EF GMBH, Hamburg (DE)

(72) Inventor: Serkan Doganer, Hamburg (DE)

(73) Assignee: SED-EF GMBH, Hamburg (DE)

( * ) Notice: Subject to any disclaimer, the term of this patent is extended or adjusted under 35 U.S.C. 154(b) by 0 days.

(21) Appl. No.: 18/850,068

(22) PCT Filed: Dec. 17, 2021

(86) PCT No.: PCT/EP2021/086672
§ 371 (c)(1),
(2) Date: Sep. 24, 2024

(87) PCT Pub. No.: WO2022/136197
PCT Pub. Date: Jun. 30, 2022

(65) Prior Publication Data
US 2025/0043854 A1  Feb. 6, 2025

(30) Foreign Application Priority Data
Dec. 22, 2020 (DE) ...................... 10 2020 134 710.3

(51) Int. Cl.
F16H 29/20 (2006.01)
F16H 29/04 (2006.01)
F16H 29/12 (2006.01)

(52) U.S. Cl.
CPC ............. *F16H 29/20* (2013.01); *F16H 29/04* (2013.01); *F16H 29/12* (2013.01)

(58) Field of Classification Search
CPC ........... F16H 29/20; F16H 29/12; F16H 29/04
See application file for complete search history.

(56) References Cited

U.S. PATENT DOCUMENTS 3,385,135 A      5/1968   Strandberg
3,561,290 A  *   2/1971   Ruck ...................... F16H 29/20
                                                                475/16

FOREIGN PATENT DOCUMENTS

DE         102008001491 A1    11/2009

* cited by examiner

*Primary Examiner* — Terence Boes
(74) *Attorney, Agent, or Firm* — Bayramoglu Law Offices LLC (57) ABSTRACT

A transmission includes a gear mechanism including a gear box, a drive shaft, and an output gear, wherein a bending movement converted into a rotational motion of the output gear is realized through a wobbled member upon rotation of the drive shaft. First and second gear wheels are connected to the output gear and each includes at least one idler pulley having a locking direction and a freewheeling direction. A wobbled plate, mounted on the drive shaft so as not to rotate independently, carries the wobbled member and is positioned to pivot within the wobbled member. The inclination angle of the wobbled plate relative to the wobbled plate rotation axis can be adjusted via control actuators, enabling the wobbled plate to tilt upon rotation of the drive shaft and thus creating a wobbled movement in the wobbled member via the bearing between the wobbled plate and the wobbled member.

20 Claims, 9 Drawing Sheets

GEARWHEEL TRANSMISSION COMPRISING WOBBLE MEMBER

CROSS REFERENCE TO THE RELATED APPLICATIONS

This application is the national phase entry of International Application No. PCT/EP2021/086672, filed on Dec. 17, 2021, which is based upon and claims priority to German Patent Application No. 10 2020 134 710.3, filed on Dec. 22, 2020, the entire contents of which are incorporated herein by reference.

TECHNICAL FIELD

The invention relates to a gearbox comprising a gear housing, a drive shaft rotatably mounted within the gear housing, and an output gear connected to an output shaft also rotatably mounted within the gear housing. The gearbox includes a gear mechanism providing functional connection between the drive shaft and the output gear. The gear mechanism comprises a wobble member positioned between the drive shaft and the output gear and designed to perform a wobbled motion upon rotation of the drive shaft; and here the wobbled member is connected to the output gear in such a way that the wobbled motion of the wobbled member is converted into a rotational motion of the output gear.

BACKGROUND

The characteristic feature of transmissions described herein is the conversion of a wobbled motion performed by a driving member, for instance, into a rotary driving motion performed by an output shaft. Such transmissions are universally applicable due to their compact design and efficient transmission of rotational torque, finding regular use in sectors such as automotive engineering. They are particularly suitable for driving components requiring high torque and precise motion, including but not limited to actuators and similar mechanisms. These transmissions are expected to meet various requirements, including high efficiency, compact size, long service life, and a uniform output, to the greatest extent possible.

The aim of the present invention is to improve a transmission of the type described in the introduction, to stand out with its compact and as simple as possible structure while achieving a high degree of effectiveness.

SUMMARY

The purpose of the invention has been achieved with a transmission having the features described in Claim 1. The advantageous embodiments of the invention are set forth in the dependent claims. According to the invention, the gearbox comprises a first gear wheel and a second gear wheel, both rotatably mounted within the gear housing and connected to the output gear, for example, in a meshing arrangement where their teeth interlock.

The first and second gear wheels are each connected to at least one idler pulley. The idler pulleys are designed to be rotatable in a relative idle direction with respect to the respective gear wheel they are connected to, and locked in a relative rotation against the gear wheel in a locking direction. In other words, the idler pulley, when engaged in the locking direction with the gear wheel, is fixedly attached to the gear wheel to transmit driving force onto the gear wheel while rotating together.

The wobbled member is functionally connected to the drive shaft. For this purpose, a wobbled plate is provided on the drive shaft, which is mounted within the wobbled member so that the wobbled plate can rotate within the wobbled member. In other words, the wobbled plate can rotate within the wobbled member. Here, the bearing used for assembly could be specifically in the form of a ball bearing arrangement, with the inner race of the ball bearing arrangement located on the wobbled plate, for example, on its outer circumference, while the outer race of the ball bearing arrangement could be anticipated on the inner side of the wobbled member. The wobbled plate is fixedly connected to the drive shaft in such a way that the wobbled plate rotates around a wobbled plate rotation axis together with the drive shaft when the drive shaft is rotated. The axis of rotation of the drive shaft is therefore on the same axis as the axis of rotation of the wobbled plate. The inclination angle of the wobbled plate relative to its rotation axis can be adjusted; in other words, the wobbled plate can be tilted relative to the drive shaft along an axis perpendicular to the drive shaft. When the wobbled plate is adjusted to be wobbled about the axis of rotation, it oscillates around the axis of rotation of the wobbled plate when the drive shaft rotates. This is achieved by allowing the wobbled member to undergo a wobbled motion via the holder guide that facilitates the mounting of the wobbled member onto the wobbled plate, or in other words, through the bearing between the wobbled plate and the wobbled member. Here, the wobbled member, for example, due to necessary tolerances, can undergo slight rocking movements around the axis of rotation of the wobbled plate or, in other words, can slightly move back and forth, but it does not perform a complete rotation movement around the axis of rotation of the wobbled plate like the wobbled plate does. The wobbled member is connected to idler pulleys in such a way that the bending motion performed by the wobbled member is converted into the back-and-forth rotational motion of the idler pulleys. The driving force transmitted to the drive shaft is then transmitted to the output gear through the drive shaft, wobbled plate, wobbled member, idler pulleys (when the idler pulleys move in the locking direction), and first and second gears. Additionally, the transmission includes control and command mechanisms that adjust the inclination angle of the wobbled plate about its axis of rotation.

The gearbox transmission adjustment is made possible by the adjustability of the inclination of the wobbled plate, and consequently, the inclination of the wobbled member. When the wobbled plate is set at an angle and the wobbled member undergoes a relative bending motion by rotating, the guided placement of the wobbled plate within the wobbled member, i.e., the wobbled plate being mounted within the wobbled member to allow the wobbled plate to rotate within it, enables the wobbled member itself to undergo a bending motion, causing the wobbled member to oscillate back and forth around multiple axes.

In this context, the wobbled member, for example, oscillates back and forth around two axes, one aligned with the axis of the wobbled plate and the other perpendicular to each other. The greater the inclination of the wobbled plate, and consequently, the wobbled member about the axis of rotation of the wobbled plate, the larger the bending motion performed by the wobbled member.

Similarly, the distance covered by the idler pulleys' back-and-forth rotational motion or the rotation of the first and second gear for each revolution of the wobbled plate also increases. The transmission adjustment is made by changing the inclination or tilt of the wobbled plate, or in other words, the wobbled member about the axis of rotation of the wobbled plate.

According to another embodiment of the invention, the control command devices are designed to adjust the inclination angle of the wobbled plate such that the wobbled plate does not undergo any bending motion when the drive shaft rotates. When the wobbled plate and the wobbled member are adjusted to a position where they will not undergo any bending motion when the drive shaft rotates, i.e., when the plane of rotation of the wobbled plate is perpendicular to the axis of rotation of the drive shaft, the idler pulleys are not engaged, thus preventing the first and second gears from being driven. In this case, the transmission becomes zero. Thus, by obtaining a transmission that can smoothly transition from a fixed transmission value in one direction to zero as desired, it becomes possible for the output shaft to remain stationary while the drive shaft rotates. Thus, in many applications, the need for a clutch mechanism and similar members can be eliminated. The control command devices can directly affect the wobbled member to adjust the inclination of both the wobbled plate and the wobbled member. Alternatively, the control command devices can directly affect the wobbled plate. The control command devices may involve mechanical, electrical, pneumatic actuating members, or any combination thereof, to change the inclination angle of the wobbled plate.

According to another embodiment of the invention, the control command devices can be designed to adjust the inclination angle of the wobbled plate continuously, allowing for non-gradually adjustment. This way, a continuously variable transmission (CVT) can be achieved. According to another embodiment of the invention, the idler pulleys can include gearwheel idler pulleys or can be designed as gearwheel idler pulleys, and the first gearwheel is connected to a first gearwheel idler pulley and a second gearwheel idler pulley; and here, the first and second gearwheel idler pulleys are designed to rotate relative to the first gearwheel in a freewheel direction and to be locked against a relative rotational motion in the locking direction.

The second gearwheel is connected to a third gearwheel idler pulley and a fourth gearwheel idler pulley; and here, the third and fourth gearwheel idler pulleys are designed to rotate relative to the second gearwheel in a freewheel direction and to be locked against a relative rotational motion in the locking direction. When the gearwheel idler pulleys are moved in the locking direction, they can transmit the driving force from the wobbled member to the first and second gearwheels. The wobbled member includes a series of gearwheel segments, each belonging to a first and second gearwheel idler pulley, with teeth interlocking. These gearwheel segments facilitate the transmission of the bending motion performed by the wobbled member, allowing the gearwheel idler pulleys to perform a back-and-forth rotational motion. This motion, in turn, enables the transmission of the driving force from the drive shaft to the output gear.

According to another configuration of the invention, the idler pulleys can be positioned to allow the transmission of driving force to the output gear or, in other words, to the first and second gear wheels, with a phase delay. In this case, during the rotation of the drive shaft, the idler pulleys do not continuously drive the first or second gear wheel; instead, the transmission of driving force from the idler pulley to the gear wheel occurs only during a specific portion of each rotation of the idler plate for each idler pulley. Additionally, the idler pulleys do not transmit driving force to the first and second gear wheels simultaneously. When one idler pulley is shifted from the locked position to the idling position during one rotation of the wobbled plate, another idler pulley moves to the locked position to assume the transmission of driving force to the respective gear wheel. Thus, each idler pulley takes on a portion of the driving force transmission. In other words, in this configuration, it is anticipated that each idler pulley of the idler pulleys will be positioned with a phase delay to come into the locked position with each rotation of the drive shaft when a bending motion is applied by the wobbled member while the drive shaft rotates.

Additionally, in another embodiment of the invention, it is envisaged that the transmission of driving force, occurring per rotation of each wobbled plate, from the idler pulleys to the first to fourth gear wheels, idler pulleys associated with the first to fourth gear wheels can be connected with a time delay, i.e., phase delay, to the wobbled member, the output gear, or, that is, the first and second gear wheels. In other words, in this configuration, it is anticipated that each idler pulley will be positioned with a phase delay relative to the wobbled member and the gear wheel segments, such that when a bending motion is applied by the wobbled member while the drive shaft rotates, each idler pulley will come into the locked position with each rotation of the drive shaft with a phase delay.

According to another embodiment of the invention, the wobbled member comprises four gear wheel segments arranged in a unified structure, fixed to or integrated with the wobbled member. The teeth of the first gear wheel segment on the wobbled member mesh with the first gear wheel idler pulley located on the first gear wheel; the teeth of the second gear wheel segment on the wobbled member mesh with the second gear wheel idler pulley located on the first gear wheel; the teeth of the third gear wheel segment on the wobbled member mesh with the third gear wheel idler pulley located on the second gear wheel; and the teeth of the fourth gear wheel segment on the wobbled member mesh with the fourth gear wheel idler pulley located on the second gear wheel. The first and third gear wheel segments are located at one end of the wobbled member, while the second and fourth gear wheel segments are located at an opposite end relative to the first end of the wobbled member. Here, the first and second ends of the wobbled member refer to the ends standing transversely in one direction relative to the rotation axis of the wobbled plate.

In other words, the gear wheel segments are located at opposite edges of the wobbled member when viewed in a direction transversely extending to the rotation axis of the wobbled plate. This allows for the idler pulleys to be appropriately positioned, and due to the reduced space required for mounting onto the first and second gear wheels, a compact design can be achieved. The placement of the segments at the opposite ends of the wobbled member particularly contributes to following the bending motion of the wobbled member around multiple axes and facilitating the sequential activation of the gear wheel idler pulleys over the gear wheel segments, i.e., transmitting the driving forces provided via the gear wheel idler pulleys to the output gear with a phase delay. The bending motion of the wobbled member periodically rotates the gear wheel idler pulleys in a locking direction and an idling direction, thereby converting the bending motion executed by the wobbled member into a rotational motion for the first and second gear wheels.

According to another embodiment of the invention, the gear wheel segments can be designed as pairs in a unified form. These paired gear wheel segments, for instance, can be formed on a structural member mounted on the wobbled member. Such a structural member could, for example, be a gear wheel or a part of a gear wheel.

In another configuration, the rotational axes of the first and second gear wheels extend transversely to the rotation axis of the wobbled plate. This provides both a compact design and contributes to the transmission of driving force via the idler pulleys with a phase delay.

According to another embodiment of the invention, control command devices may include one or more linear adjustment units with axially movable actuators. The linear adjustment units preferably comprise one or more shaft drive units. A shaft drive unit includes a shaft with external screw threads and an actuator with internal screw threads that engage with the external screw threads on the shaft. When the shaft is moved within the actuator, it causes the actuator to move along the length of the shaft.

According to another embodiment of the invention, one or more linear adjustment units can be at least partially positioned within the drive shaft. Thus, one or more shafts can pass through a drive shaft equipped with a suitable longitudinal bore. Multiple linear adjustment units, preferably extending in the direction of the rotation axis of the wobbled plate or the drive shaft, can share a single common shaft at the opposite ends of the wobbled plate. This shaft may specifically have two sets of opposing screw threads, one designed to rotate to the right and the other to the left. Consequently, when the shaft is turned, the two actuators located on different sets of screw threads can be moved in opposite directions. The motion of the shaft can be facilitated via the drive shaft. The shaft drive, for instance, may include an electric drive mechanism integrated at least partially into the drive shaft.

According to another embodiment of the invention, one or more actuators belonging to one or more linear adjustment units can be positioned onto or within the drive shaft in such a way that they perform rotational motion relative to the drive shaft, yet can be moved axially along the rotation axis of the drive shaft. For this purpose, there may be a guide section on the drive shaft that prevents the actuator from making a relative rotational motion to the drive shaft but allows the actuator to slide along the rotation axis of the drive shaft. Here, the shaft can pass through the drive shaft equipped with a suitable clearance for the shaft passage. During operation, the shaft and actuator are rotated around the rotation axis of the wobbled plate along with the drive shaft and the wobbled plate.

In another embodiment of the invention, a relative rotational motion between the shaft and the drive shaft occurs only when adjustment of the inclination of the wobbled plate is desired.

According to another configuration of the invention, one or more linear adjustment units may include one or more articulated arms forming a connection between the actuator and the wobbled plate to adjust the inclination of the wobbled plate. The articulated arms serve as connections between the actuator and the wobbled plate and may be characterized by an additional articulated section that connects the two parts of the articulated arm together.

In another embodiment of the invention, multiple actuators can be positioned at opposite ends of the wobbled plate along the rotation axis of the wobbled plate, where the actuators and associated articulated arms can be arranged symmetrically relative to the oscillation center of the wobbled plate. In other words, the articulated arms are positioned diametrically opposite to the oscillation center of the wobbled plate. This arrangement ensures that the articulated arms, and consequently the actuators, are not only located on different sides of the wobbled plate but also positioned at different sides relative to the rotation axis of the wobbled plate when viewed in a direction transversely extending to the rotation axis of the wobbled plate. Thanks to this symmetrical arrangement of the articulated arms and thus the actuators, an equal distribution of weight is achieved on the rotating drive shaft by the control command devices.

In another embodiment of the invention, the control command devices may include a linear adjustment unit with an actuator that can be moved coaxially or parallel to the drive shaft. The actuator is located outside the gear housing. It is connected to one or more articulated arms via a connection passing through the wall of the gear housing. The actuator is mounted on a shaft located outside the gear housing. The motion of the shaft can be facilitated by a drive source located outside the gear housing, such as an electric motor. This way, the actuator drive can be easily separated from the drive shaft drive, providing both design simplicity and ease of maintenance. When the actuator extends outside the gear housing, it can extend axially along the drive shaft. Alternatively, or additionally, the member can extend axially outside the gear housing.

BRIEF DESCRIPTION OF THE DRAWINGS

The present invention is detailed below with reference to exemplary embodiments, and the following are shown in the drawings:

FIG. 2A: Components of the Transmission.

FIG. 2B: Components of the Transmission.

FIG. 9A: Continuous Variable Transmission.

FIG. 9B: Continuous Variable Transmission.

REFERENCE MARKS

1. Transmission
2. Gearbox
3. Drive Shaft
4. Output shaft
5. Output Gear
6. First toothed wheel
7. Second toothed wheel
8. First and second gear wheel rotation axis
9. Wobbled member
10. Wobbled Plate
11. Wobbled plate rotation axis
12. Wobbled Axis 13. Control command devices
14. Electromotor
15. Control command devices drive connections
16. Ball bearing assembly
17. Wobbled member First End
18. Wobbled member Second End
19. First Gear Wheel Segment
20. Second Gear Wheel Segment
21. Third Gear Wheel Segment
22. Fourth Gear Wheel Segment
23. Actuator
24. Actuator
25. Articulated arm
26. Articulated arm
27. First gear wheel idler pulley
28. Second gear wheel idler pulley
29. Lock direction
30. Idle Direction
31. First gear wheel idler pulley screw gears
32. Second gear wheel idler pulley screw gears
33. Third gear wheel idler pulley
34. Fourth gear wheel idler pulley
35. Lock direction
36. Idle Direction
37. Third gear wheel idler pulley screw gears
38. Fourth gear wheel idler pulley screw gears
39. Shaft
40. Screw gear part
41. Screw gear part
42. Axial guide
43. Axial guide
44. First Axis
45. Second Axis
46. Actuator
47. Articulated arm
48. Shaft

DETAILED DESCRIPTION OF THE EMBODIMENTS

Figure 1:
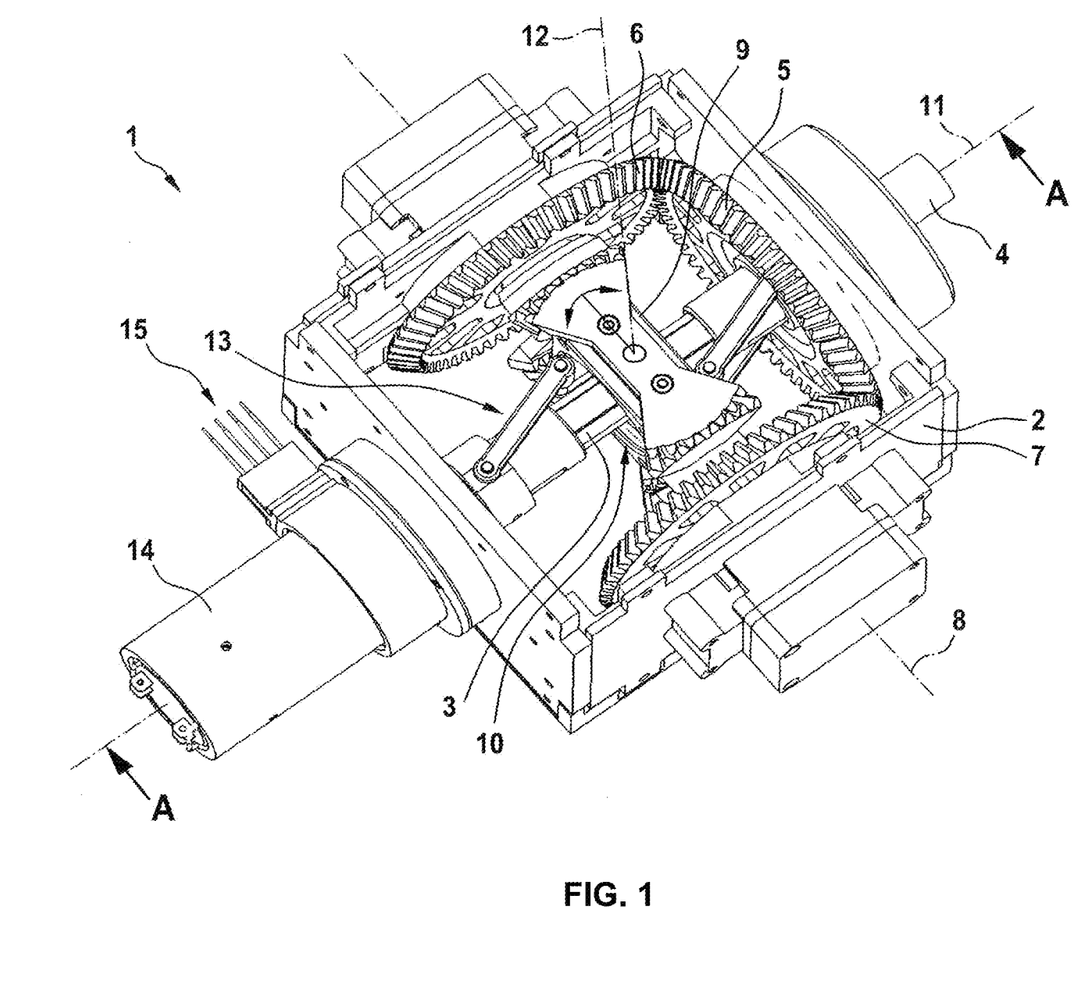
FIG. 1: Continuous Variable transmission suitable for a first embodiment of the invention.

FIG. 1 depicts a transmission (1) suitable for a first embodiment of the invention. This transmission (1) comprises a gear housing (2) containing a drive shaft (3) which is rotatably housed within the gear housing. To illustrate the internal structure of the transmission, the components of the gear housing (2) are not shown in the drawing. Additionally, the transmission also includes an output shaft (4) which is likewise rotatably housed within the gear housing (2) and is fixedly connected to an output gear (5).

On the opposite inner sides of the gear housing, there are a first gear (6) and a second gear (7) rotatably housed within the gear housing (2) in opposite directions. The first gear (6) and the second gear (7) are positioned coaxially with respect to their rotation axes, and their teeth mesh with the teeth of the output gear (5). The rotation axes of the first and second gears (6, 7) are transverse to the rotation axis of the drive shaft (3). The drive shaft (3) and the output gear (5) are functionally connected to each other through a gear mechanism involving the first and second gears (6 and 7). The gear mechanism consists primarily of a wobbled member (9) in a rectangular structure and an wobbled plate (10) located within it. The drive shaft (3) extends along an axis called the wobbled plate rotation axis (11). The wobbled plate (10) is mounted on the drive shaft (3) to rotate with it around the wobbled plate rotation axis (11); thus, the rotation axis of the drive shaft coincides with the wobbled plate rotation axis (11), and the wobbled plate (10) cannot rotate separately from the drive shaft (3) around the wobbled plate rotation axis (11). However, the wobbled plate (10) can perform a lateral bending movement in relation to the axis of rotation of the wobbled plate (11) (here, the wobbled axis); in other words, the wobbled plate (10) can sway sideways relative to the drive shaft (3) or, in other words, to the axis of rotation of the wobbled plate (11) as indicated by the curved double arrow in the drawing.

Adjustment tools or control command devices (13) are provided to adjust the inclination of the wobbled plate (10) around its wobbled axis (12) relative to the axis of rotation of the wobbled plate (11).

The drive shaft (3) can be driven through any conceivable drive source. In the configuration shown here, the drive shaft (3) is connected to an electric motor (14). The control command devices (13) also operate electrically, and for this purpose, connections (15) are provided.

Figure 2A:
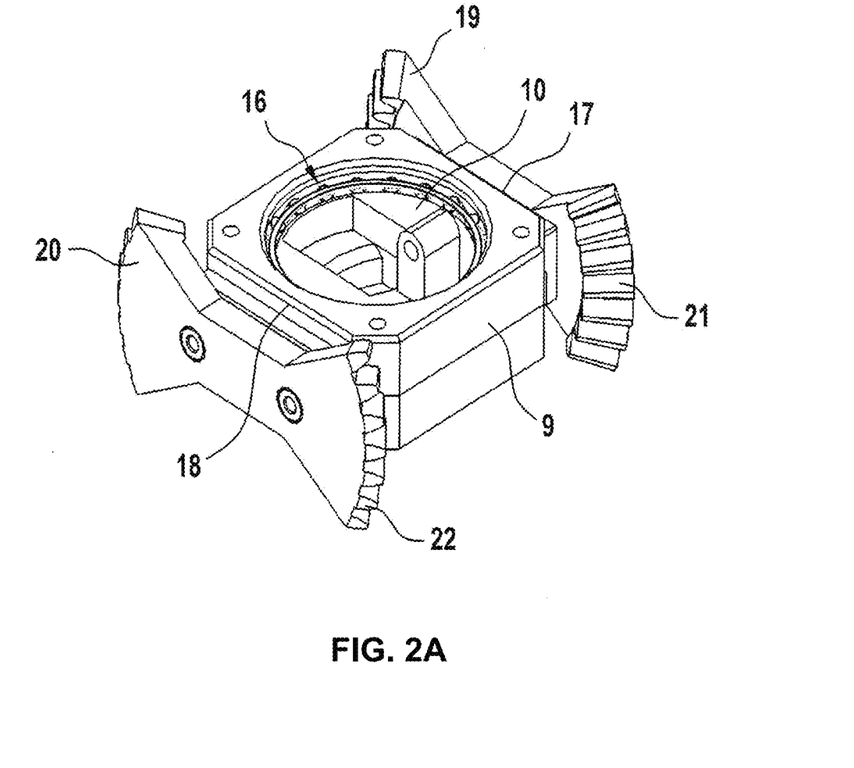
FIGS. 2A-2B: Components of the transmission corresponding to FIG. 1.
Figure 2B:
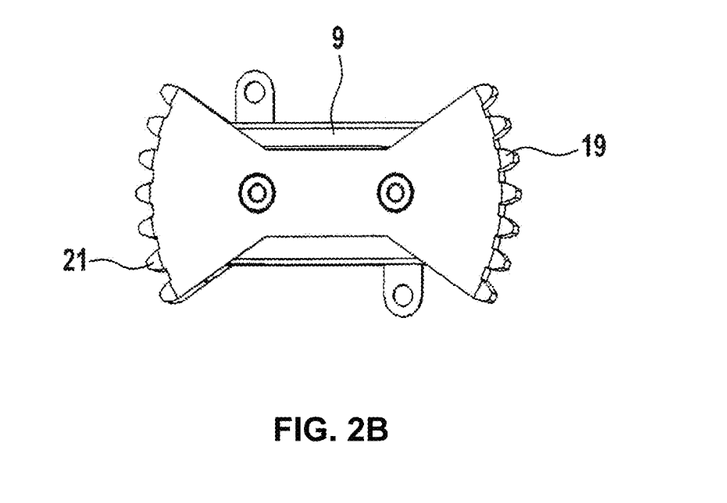

In FIGS. 2A-2B, a wobbled member (9) consistent with FIG. 1 is observed. A wobbled plate (10) is placed within the wobbled member (9) via a ball bearing assembly (16) in a rotatable manner. The wobbled plate (10) is mounted on the drive shaft and carries the wobbled member (9). The ball bearing assembly (16) ensures that when the inclination of the wobbled plate (10) on the drive shaft is changed, it causes the wobbled member (9) to tilt along with the wobbled plate (10).

The wobbled member (9) is cuboid in shape and has a series of gear wheel segments (19, 20, 21, 22) at opposite ends (17, 18). The first gear wheel segment (19) and the third gear wheel segment (21) are fixed and non-rotatably attached to the first end (17) of the wobbled member (9) and extend outward from the center. The first gear wheel segment (19) and the third gear wheel segment (21) are integral structures. The second gear wheel segment (20) and the fourth gear wheel segment (22) are similarly fixed and non-rotatably attached to the second end (18) of the wobbled member (9) and extend outward from the center. The second gear wheel segment (20) and the fourth gear wheel segment (22) are also integral structures.

Figure 3:
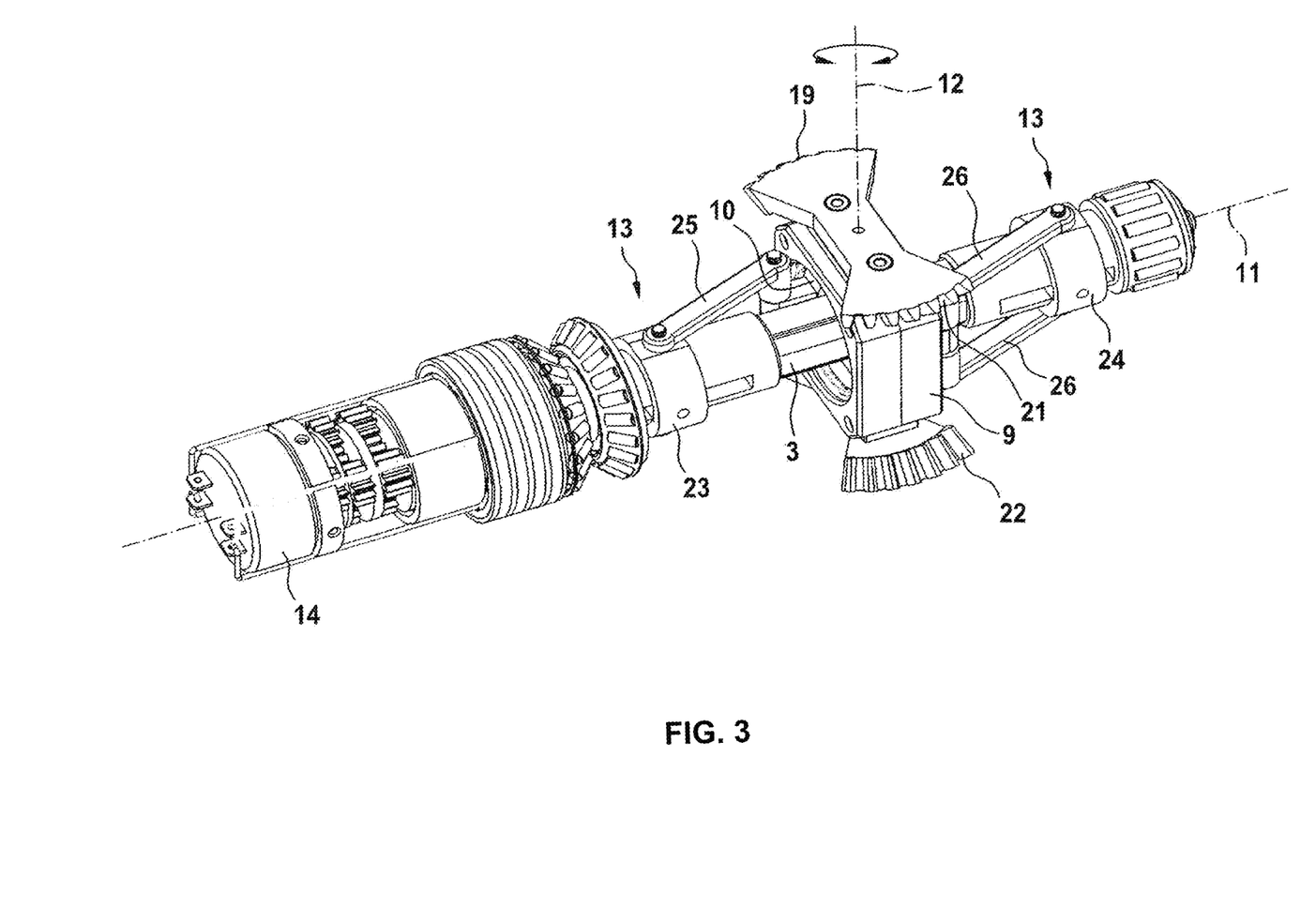
FIG. 3: Components of the Transmission corresponding to FIG. 1.

FIG. 3 depicts the arrangement of the wobbled member (9) and the wobbled plate (10) on the drive shaft (3). The wobbled plate (10) is mounted on the drive shaft (3) and carries the wobbled member (9) via the ball bearing assembly as described within the scope of FIGS. 2A-2B. Control command devices (13) are provided to bend the wobbled plate (10) around the wobbled axis (12) relative to the axis of rotation of the wobbled plate (11), which includes linear adjustment units containing a shaft within the drive shaft (3), as shown in the transmission cross-sectional view in FIG. 6. On the drive shaft (3), two actuators (23 and 24) are positioned at opposite ends of the wobbled member (9). The actuators (23, 24) are axially placed within the drive shaft (3) along an axial aperture extending along the axis of rotation of the wobbled plate (11), thus being rotationally fixed to the drive shaft (3), but capable of being axially moved in the direction of the axis of rotation of the wobbled plate (11).

The actuators (23, 24) are connected to articulated arms (25, 26). These articulated arms (25, 26) facilitate the connection of the respective actuator (23, 24) to the wobbled plate (10). When the actuators (23, 24) are axially moved relative to the drive shaft (3) along the axis of rotation of the wobbled plate (11), it causes the wobbled plate (10) to bend around the wobbled axis (12) relative to the axis of rotation of the wobbled plate (11) (as shown by the curved double arrow). Through the socket connection between the wobbled plate (10) and the wobbled member (9), this bending motion is transferred to the wobbled member (9), causing it to assume a wobbled position as well.

Figure 4:
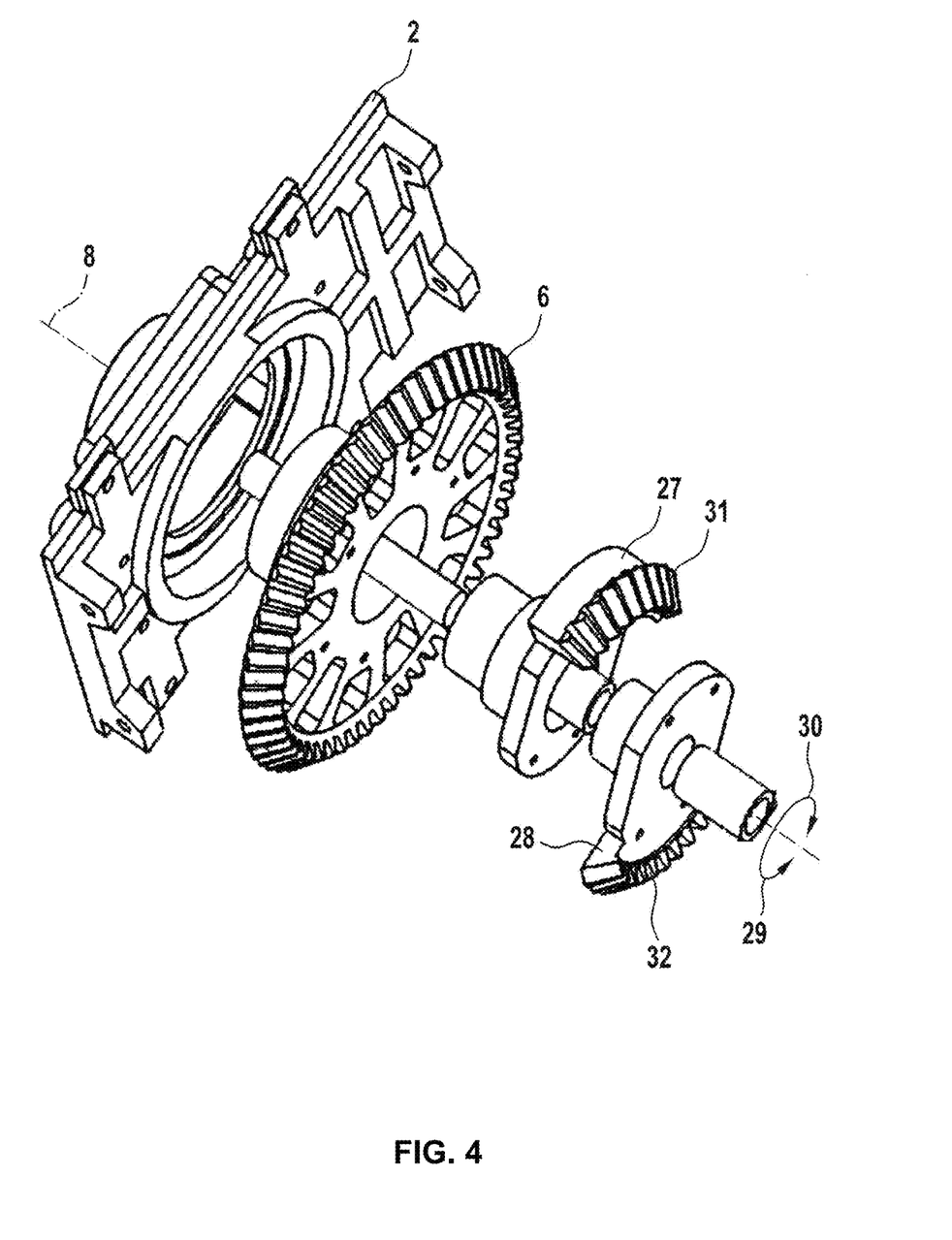
FIG. 4: Components of the Transmission corresponding to FIG. 1.

FIG. 4 illustrates the exploded view of the transmission components corresponding to FIG. 1. In FIG. 4, the first gear wheel (6) is depicted, which is placed within the gear housing (2) and can rotate around the axis of rotation (8). It is equipped with bevel gears that mesh with the output gear. Within the first gear wheel (6), there are two idle pulleys: the first idle pulley (27) and the second idle pulley (28). The idle pulleys (27 and 28) have a locking direction (29) and a freewheeling direction (30) around the axis of rotation (8). In the lock direction (29), the gear idler pulleys (27 and 28) are prevented from relatively rotating to the first gear wheel (6), and when a gear idler pulley is rotated around the axis (8) in the lock direction, this rotational movement is transferred to the first gear wheel (6). The gearwheel idlers 28, 27 have gears 31, 32. The gears (31) in the first gearwheel idler pulley (27) are intertwined with the first gearwheel ring (19) of the wobbled member (9) (FIGS. 2A-2B). The gears (32) in the second gear wheel idler pulley (28) are intertwined with the second gear wheel ring (20) on the other side of the wobbled member (9) (FIGS. 2A-2B).

Figure 5:
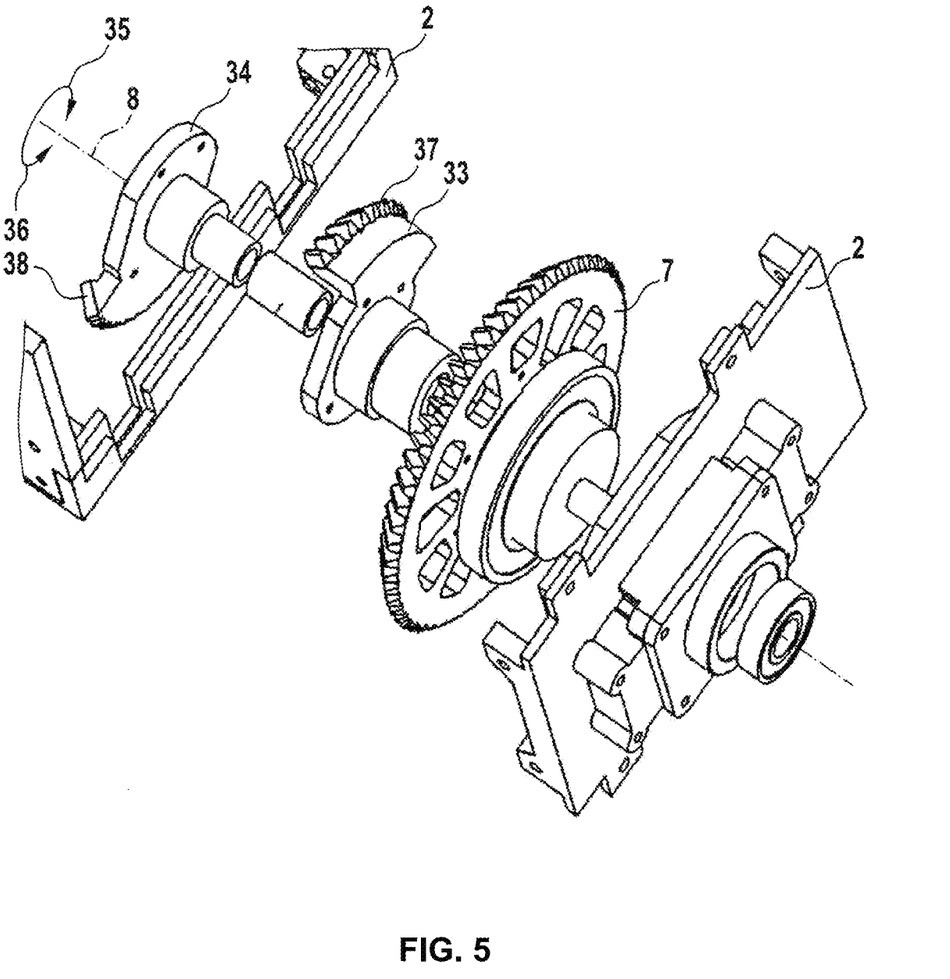
FIG. 5: Components of the Transmission corresponding to FIG. 1.

FIG. 5 illustrates the exploded view of the transmission components corresponding to FIG. 1. In FIG. 5, the second gear wheel (7) is depicted, which is placed within the gear housing (2) and can rotate around the axis of rotation (8). In the second gear wheel (7), there are two idle pulleys: the third idle pulley (33) and the fourth idle pulley (34). Within the second gear wheel (7), there are two idle pulleys: the third idle pulley (33) and the fourth idle pulley (34). The idle pulleys (33 and 34) have a locking direction (35) and a freewheeling direction (36) around the axis of rotation (8). When the idle pulleys (33 and 34) rotate in the freewheeling direction (36), the second gear wheel (7) can rotate freely relative to them. In the locking direction (35), the relative rotation of the idle pulleys (33 and 34) with respect to the second gear wheel (7) is prevented. When one of the idle pulleys is rotated in the locking direction around the axis (8), this rotational movement is transmitted to the second gear wheel (7). The idle pulleys (33, 34) have gears (37, 38). The gears (37) in the third idle pulley (33) are meshed with the third gear wheel segment (21) of the wobbled member (9) (FIGS. 2A-2B). The gears (38) in the fourth idle pulley (34) are meshed with the fourth gear wheel segment (22) of the wobbled member (9) on the other side (FIGS. 2A-2B).

When the dedicated idle pulleys for the first and second gear wheels (6, 7) are rotated in the locking direction, this driving force is transmitted to the output gear. Due to the opposite arrangement of the locking directions between the first and second gear wheels, the output gear is always driven in one direction of rotation.

Figure 6:
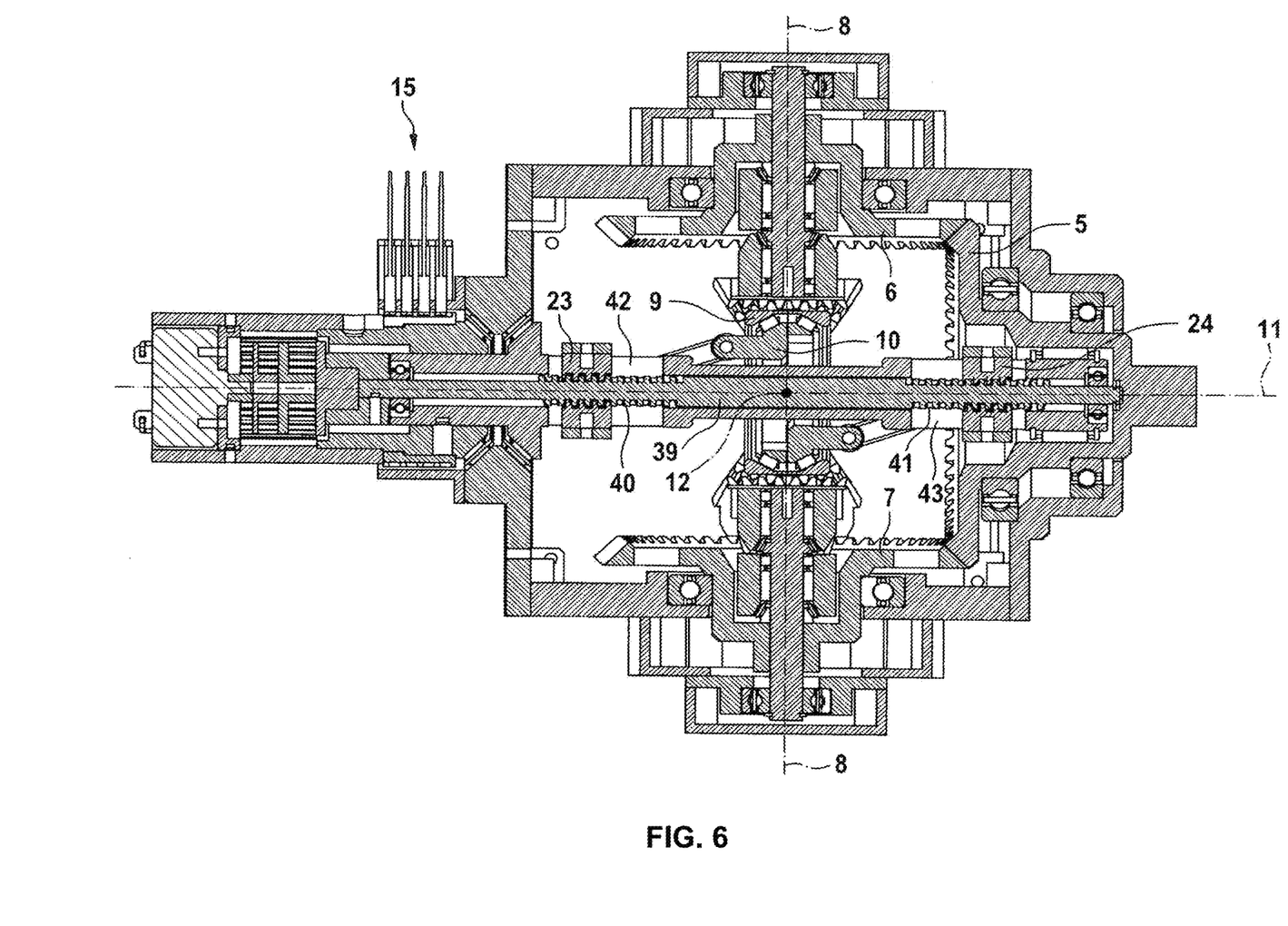
FIG. 6: Sectional view taken along line A-A of the Transmission corresponding to FIG. 1.

FIG. 6 shows a sectional view taken along the A-A axis of the transmission corresponding to FIG. 1. The drive shaft (3) extends along the axis of rotation of the wobbled plate (11). The wobbled plate (10) is mounted on the drive shaft (3) and carries the wobbled member (9). The wobbled plate (10) rotates around the axis of rotation of the wobbled plate (11) together with the drive shaft (3) and can tilt around the wobbled axis (12).

Figure 7:
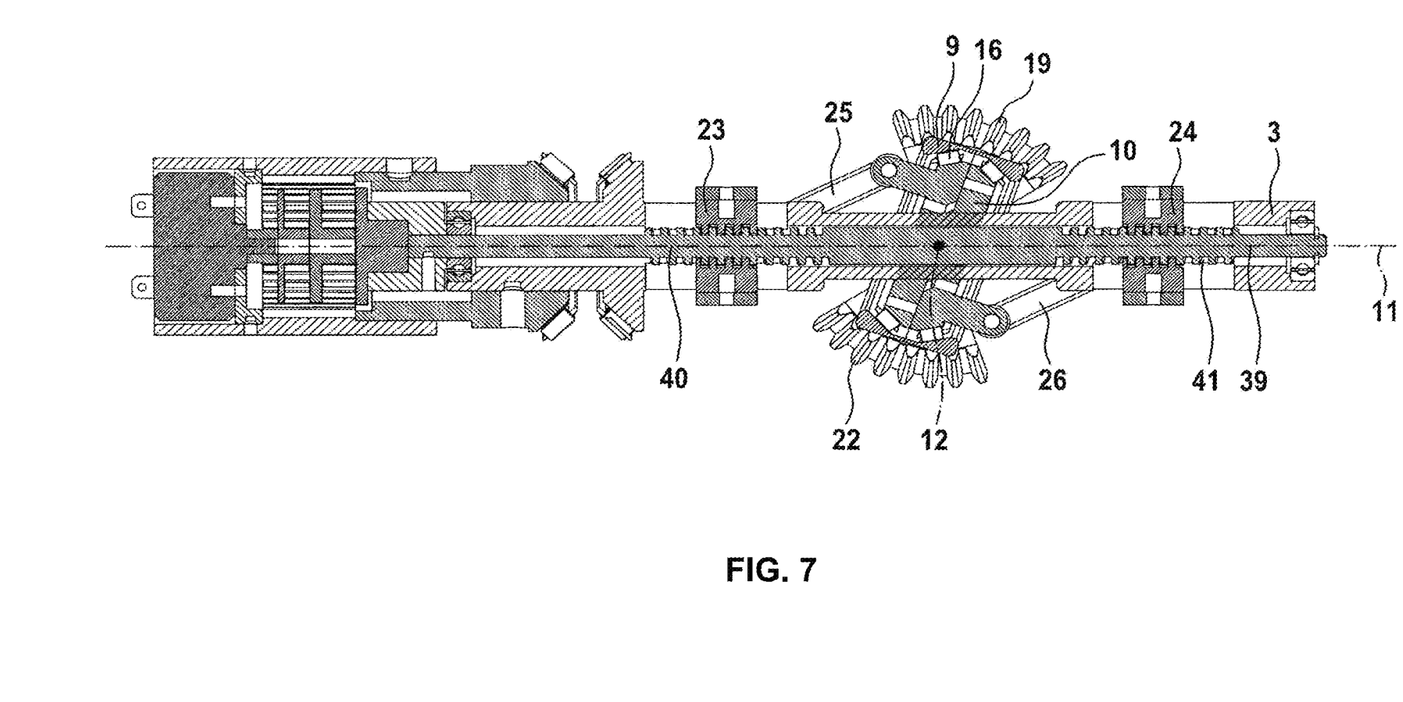
FIG. 7: Cross-sectional view of the components of the Transmission corresponding to FIG. 1.

Inside the drive shaft (3), there is a shaft (39) that rotates along with the drive shaft (3) during operation. This shaft (39) has two sets of opposite-oriented threaded gears, located at the opposite ends of the wobbled member (9), denoted as threaded gear sections (40, 41). The actuators (23, 24) are mounted on these threaded gear sections (40, 41). The actuators (23, 24) are placed on axial guides (42, 43) located within the drive shaft. The shaft (39) is connected to an electric drive mechanism of the control command devices (15) to rotate the shaft (39) relative to the drive shaft (3) and adjust the axial position of the actuators (23, 24) along the axis of rotation of the wobbled plate. FIG. 7 illustrates the operation of the control command devices. When the shaft (39) is rotated relative to the drive shaft (3) in a specific direction, the actuators (23, 24) are moved in opposite directions (here, towards each other) along the axis of rotation of the wobbled plate (11) through the threaded gear sections (40, 41). The articulated arms (25 and 26) cause the wobbled plate (10) to bend around the wobbled axis (12), transferring this bending motion to the wobbled member (9) via the ball bearing assembly (16). The axial position adjustment of the actuators (23, 24) occurs continuously and can be applied during operation, i.e., while the drive shaft continues to rotate. The wobbled plate (10) can be rotated between a non-wobbled position, where it is largely perpendicular to the axis of rotation of the wobbled plate (11) (see FIG. 6), and an wobbled position (see FIG. 7).

When the drive shaft shown in FIG. 7 is rotated around the axis of rotation of the wobbled plate (11), this rotational motion is transmitted to the wobbled plate (10). Due to its wobbled position, the wobbled plate (10) undergoes a spatial bending movement during this process. Within this bending motion, the wobbled plate (10) rotates relative to the wobbled member (9). The ball bearing (16) enables the wobbled member (9) to perform a bending motion around two axes perpendicular to each other and perpendicular to the axis of rotation of the wobbled plate (11). Since the gear wheel segments are fixedly attached to the wobbled member (9), they also follow this bending motion. During this bending motion, the gear wheel segments (19, 20, 21, 22) at the corner positions of the wobbled member (9) move back and forth along the axis of rotation of the wobbled plate (11). This motion is transmitted via gears meshing with the gear wheel idler pulleys to the gear wheel idler pulleys of the first and second gear wheels, which perform reciprocating rotation around the axis of rotation (8) during the bending movements performed by the wobbled member (9). When the gear wheel idle pulleys are rotated in the locking direction, this motion is transferred to the respective gear wheels.

As a result of the bending motion performed by the wobbled member, the first through fourth gear wheel idle pulleys are moved in the locking direction with a time delay (phase delay), not simultaneously. Consequently, the transmission of driving force to the output gear is achieved through the gear wheel idle pulleys.

Figure 8:
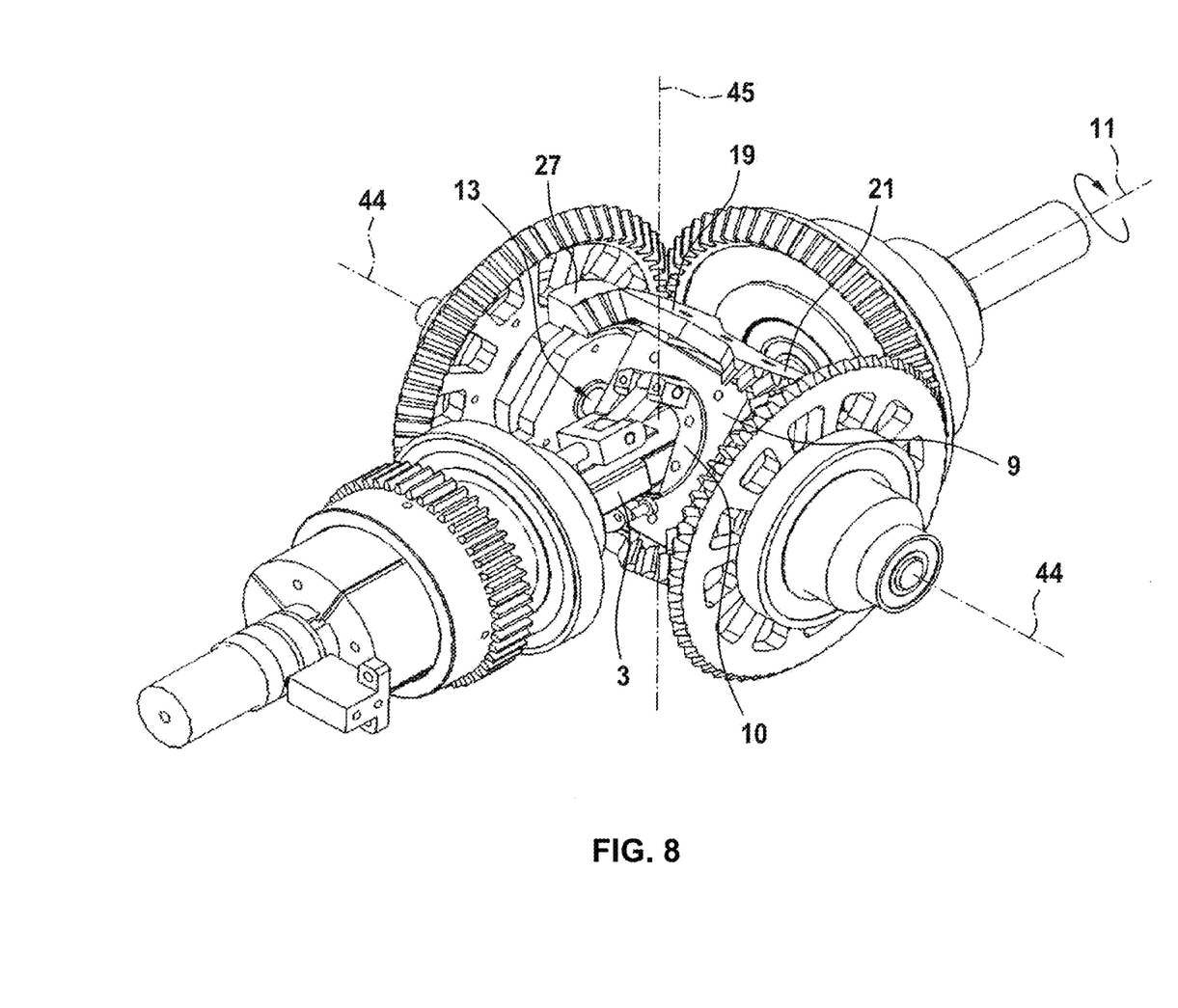
FIG. 8: Continuous Variable Transmission suitable for another embodiment of the invention.

In FIG. 8 a modified structure of the transmission is depicted, showing a wobbled position. The bending motion performed by the wobbled member follows the same principle as described in FIG. 7. Here, the wobbled plate (10) is brought into a wobbled position relative to the axis of rotation of the wobbled plate (11) through the control command devices (13). The drive shaft (3) rotates around the axis of rotation of the wobbled plate (11). The wobbled member (9) is subjected to a rocking motion, oscillating back and forth around both a first axis (44) perpendicular to each other and to the axis of rotation of the wobbled plate (11), and a second axis (45). In FIG. 8, the wobbled member (9) is depicted in a position where it is slightly wobbled around both axes (44, 45). This bending motion is transferred to the idle pulleys, which drive the first and second gear wheels by moving back and forth in the locking direction, via gear wheel segments (shown here as 19 and 21). As a result, the output gear performs continuous rotation in one direction.

Figure 9A:
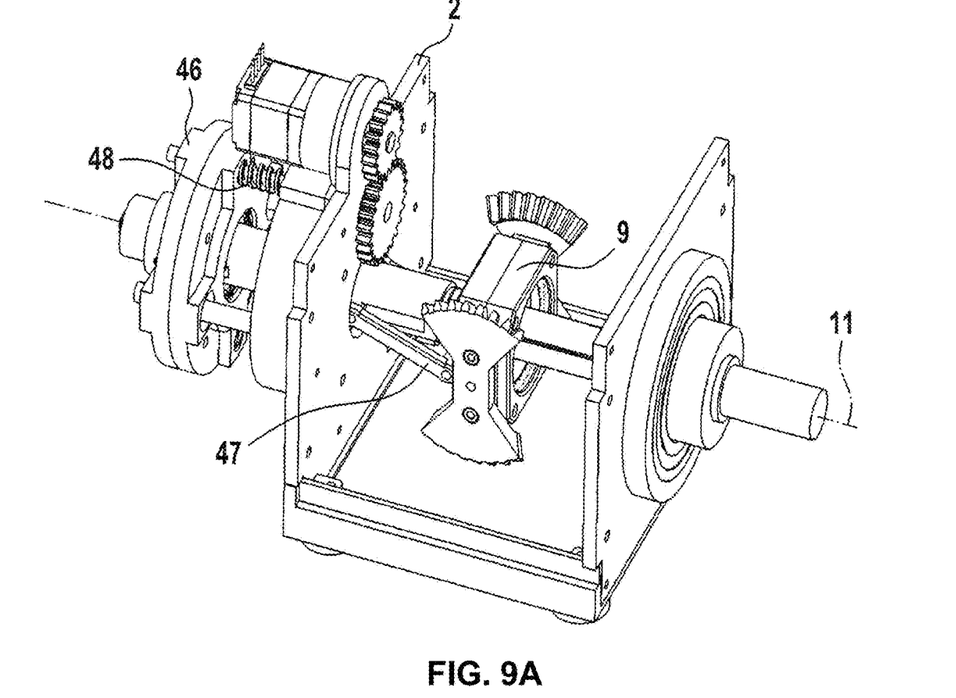
FIGS. 9A-9B: Continuous Variable Transmission suitable for another embodiment of the invention.
Figure 9B:
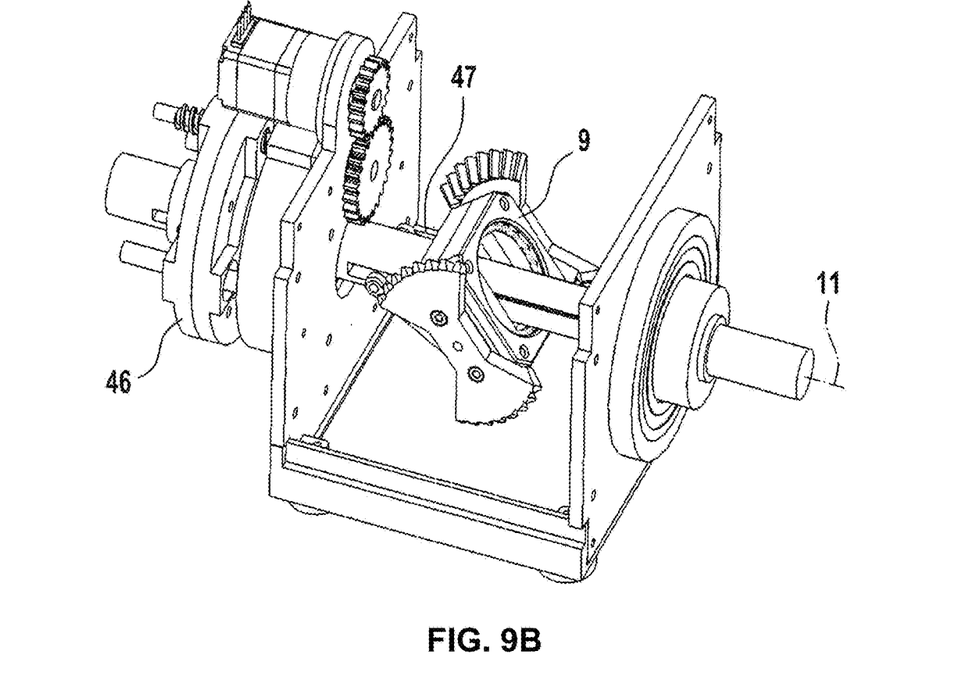

FIGS. 9A-9B depict a transmission compatible with another embodiment, shown in two separate images. Here, the linear adjustment unit comprises one or optionally multiple actuators (46). The actuator (46) is positioned outside the gear housing (2) and is connected to articulated arms (47) in a manner that passes through the wall of the gear housing. A drive mechanism for the control command devices, containing a shaft (48), is also located outside the gear housing (2). By axially moving the actuator (46) in the direction of the axis of rotation of the wobbled plate (11), axial movement of the actuator (46) is ensured (FIG. 9B). The inclination adjustment of the wobbled member is carried out through the articulated arm (47).

What is claimed is:

1. A gear housing consist of
a drive shaft rotatably positioned within the gear housing;
an output gear rotatably positioned within the gear housing;
a gear mechanism positioned between the drive shaft and the output gear to provide functional connection between them, wherein the gear mechanism is located between the drive shaft and the output gear and designed to perform a bending motion upon rotation of the drive shaft, comprising an wobbled member and wherein the wobbled member is connected to the output gear in such a way that the bending motion of the wobbled member is converted into rotational motion of the output gear, constituting a transmission, and characterized by including:
a first gear wheel and a second gear wheel rotatably positioned within the gear housing and connected to the output gear, wherein the first gear wheel and the second gear wheel are each connected to at least one gear wheel idle pulley, and the gear wheel idle pulleys will be rotatable in a relative freewheeling direction with respect to the first and second gears, and in a locking direction, they are designed to be locked against a relative rotational movement of the respective gear wheel;
a tilted wobble plate mounted on the drive shaft and carrying the wobbled member, wherein the tilted wobble plate is mounted rotatably within the wobbled member and is mounted to rotate together with the drive shaft about the axis of rotation of the tilted wobble plate, and here, the tilted wobble plate has an adjustable inclination angle relative to the axis of rotation of the tilted wobble plate, thereby allowing the tilted wobble plate to perform a bending motion relative to the axis of rotation of the tilted wobble plate while the drive shaft rotates, and causing the wobbled member to also undergo a bending motion through a bearing connecting the tilted wobble plate to the wobbled member;
wherein the wobbled member is connected to the gear wheel idle pulleys, such that the bending motion performed by the wobbled member is converted into back-and-forth rotational motion of the gear wheel idle pulleys, and is connected in a manner such that the driving force transmitted to the drive shaft is transferred to the output gear, ensuring the conversion of the driving force to the output gear in response to the back-and-forth rotational motion of the gear wheel idle pulleys;
additionally, control command devices are provided here to adjust the inclination angle at which the tilted wobble plate stands relative to the axis of rotation of the tilted wobble plate.

2. A transmission according to claim 1, wherein the control command devices are designed to adjust the inclination angle of the tilted wobble plate such that the tilted wobble plate does not undergo any bending motion when the drive shaft rotates.

3. A transmission according to claim 1, wherein the control command devices are designed to adjust the inclination angle of the tilted wobble plate continuously.

4. A transmission according to claim 1, wherein the idle pulleys include gear wheel idle pulleys;
here, the first gear wheel is connected to the first gear wheel idle pulley and the second gear wheel idle pulley, and the first and second gear wheel idle pulleys are designed to rotate relative to the first gear wheel in a freewheeling direction and to be locked in a locking direction against relative rotational movement of the first gear wheel;
here, the second gear wheel is connected to the third gear wheel idle pulley and the fourth gear wheel idle pulley; the third and fourth gear wheel idle pulleys are designed to rotate relative to the second gear wheel in a freewheeling direction, and to be locked in a locking direction against relative rotational movement of the second gear wheel;
here, the wobbled member engages with a gear wheel idle pulley belonging to each of the first and second gear wheels, allowing the transmission of the bending motion performed by the wobbled member and enabling the gear wheel idle pulleys to undergo back-and-forth rotational motion; and thus, a series of gear wheel segments is included to transmit the driving force transmitted to the drive shaft to the output gear.

5. A transmission according to claim 4, wherein the first to fourth gear wheel idle pulleys are connected to the wobbled member in a sequential manner such that the transmission of driving force occurring between the first and second gear wheels is successively carried out by the first to fourth gear wheel idle pulleys.

6. A transmission according to claim 4, wherein the wobbled member comprises four gear wheel segments arranged to be fixed to or integrated with the wobbled member, and herein, the teeth of the first gear wheel segment in the wobbled member are engaged with the first gear wheel idle pulley; the teeth of the second gear wheel segment in the wobbled member are engaged with the second gear wheel idle pulley; the teeth of the third gear wheel segment in the wobbled member are engaged with the third gear wheel idle pulley; and the teeth of the fourth gear wheel segment in the wobbled member are engaged with the fourth gear wheel idle pulley;
herein, the first and third gear wheel segments are located at one end of the wobbled member, while the second and fourth gear wheel segments are located at the opposite end of the wobbled member relative to the first end.

7. A transmission according to claim 6, wherein the gear wheel segments are designed as integral pairs.

8. A transmission according to claim 1, wherein the rotational axes of the first gear wheel and the second gear wheel extend transversely relative to the wobbled axis of the tilted wobble plate.

9. A transmission according to claim 1, comprising one or more linear adjustment units, preferably including axially movable actuators in the form of a spindle drive, and specifically including a shaft having particularly right and left-handed thread gears.

10. A transmission according to claim 9, wherein one or more of the linear adjustment units are at least partially positioned within the drive shaft.

11. A transmission according to claim 9, wherein the actuator is mounted onto or into the drive shaft to perform rotational movement relative to the drive shaft and to be movable axially.

12. A transmission according to claim 1, wherein one or more linear adjustment units comprise one or more articulated arms forming a connection between the actuator and the tilted wobble plate.

13. A transmission according to claim 12, wherein multiple actuators are located at opposite ends of the tilted wobble plate along the wobbled axis, and wherein the actuators and associated articulated arms are symmetrically positioned relative to the oscillation center of the tilted wobble plate at opposite ends of the tilted wobble plate.

14. A transmission according to claim 1, comprising a linear adjustment unit with an actuator capable of being moved coaxially or in parallel with respect to the drive shaft, and wherein the actuator is positioned on a shaft located outside the gear box, and wherein the actuator is connected to one or more articulated arms in a manner allowing it to pass through the wall of the gear box.

15. A transmission according to claim 2, wherein the control command devices are designed to adjust the inclination angle of the tilted wobble plate continuously.

16. A transmission according to claim 2, wherein the idle pulleys include gear wheel idle pulleys;
  here, the first gear wheel is connected to the first gear wheel idle pulley and the second gear wheel idle pulley, and the first and second gear wheel idle pulleys are designed to rotate relative to the first gear wheel in a freewheeling direction and to be locked in a locking direction against relative rotational movement of the first gear wheel;
  here, the second gear wheel is connected to the third gear wheel idle pulley and the fourth gear wheel idle pulley; the third and fourth gear wheel idle pulleys are designed to rotate relative to the second gear wheel in a freewheeling direction, and to be locked in a locking direction against relative rotational movement of the second gear wheel;
  here, the wobbled member engages with a gear wheel idle pulley belonging to each of the first and second gear wheels, allowing the transmission of the bending motion performed by the wobbled member and enabling the gear wheel idle pulleys to undergo back-and-forth rotational motion; and thus, a series of gear wheel segments is included to transmit the driving force transmitted to the drive shaft to the output gear.

17. A transmission according to claim 3, wherein the idle pulleys include gear wheel idle pulleys;
  here, the first gear wheel is connected to the first gear wheel idle pulley and the second gear wheel idle pulley, and the first and second gear wheel idle pulleys are designed to rotate relative to the first gear wheel in a freewheeling direction and to be locked in a locking direction against relative rotational movement of the first gear wheel;
  here, the second gear wheel is connected to the third gear wheel idle pulley and the fourth gear wheel idle pulley; the third and fourth gear wheel idle pulleys are designed to rotate relative to the second gear wheel in a freewheeling direction, and to be locked in a locking direction against relative rotational movement of the second gear wheel;
  here, the wobbled member engages with a gear wheel idle pulley belonging to each of the first and second gear wheels, allowing the transmission of the bending motion performed by the wobbled member and enabling the gear wheel idle pulleys to undergo back-and-forth rotational motion; and thus, a series of gear wheel segments is included to transmit the driving force transmitted to the drive shaft to the output gear.

18. A transmission according to claim 5, wherein the wobbled member comprises four gear wheel segments arranged to be fixed to or integrated with the wobbled member, and herein, the teeth of the first gear wheel segment in the wobbled member are engaged with the first gear wheel idle pulley; the teeth of the second gear wheel segment in the wobbled member are engaged with the second gear wheel idle pulley; the teeth of the third gear wheel segment in the wobbled member are engaged with the third gear wheel idle pulley; and the teeth of the fourth gear wheel segment in the wobbled member are engaged with the fourth gear wheel idle pulley;
  herein, the first and third gear wheel segments are located at one end of the wobbled member, while the second and fourth gear wheel segments are located at the opposite end of the wobbled member relative to the first end.

19. A transmission according to claim 2, wherein the rotational axes of the first gear wheel and the second gear wheel extend transversely relative to the wobbled axis of the tilted wobble plate.

20. A transmission according to claim 3, wherein the rotational axes of the first gear wheel and the second gear wheel extend transversely relative to the wobbled axis of the tilted wobble plate.

* * * * *